Figure 4:
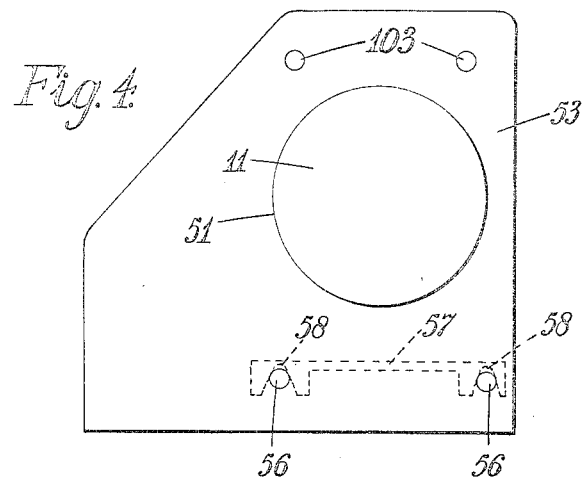

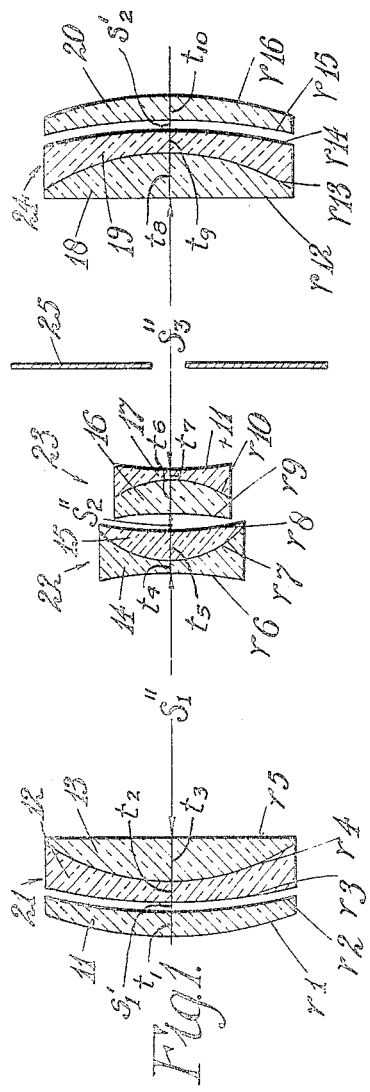

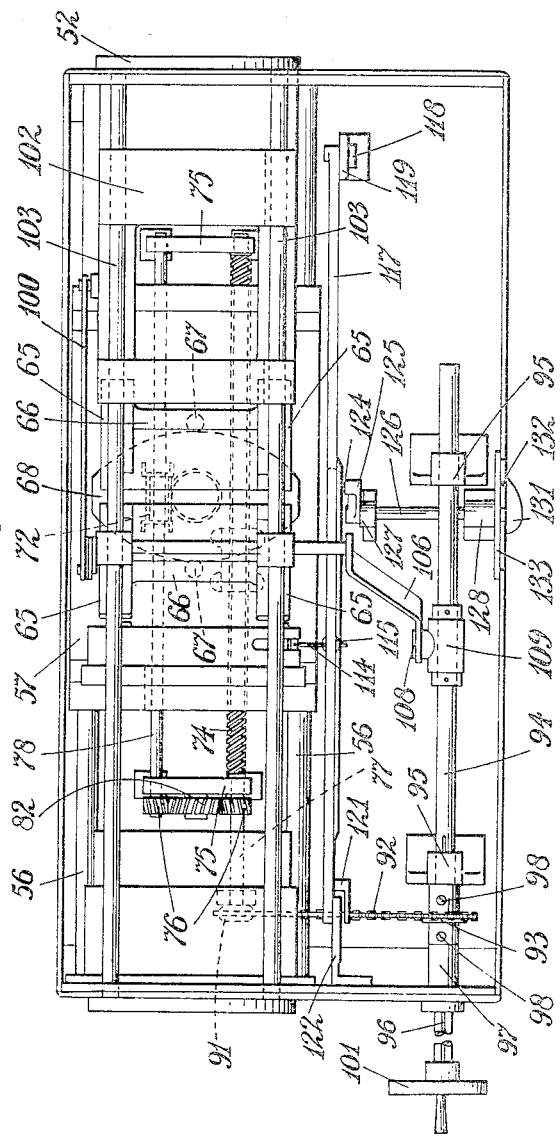

United States Patent Office 2,746,350
Patented May 22, 1956

2,746,350

VARIABLE MAGNIFICATION OPTICAL SYSTEMS

Harold Horace Hopkins, London, England, assignor to W. Watson & Sons Limited, London, England, a British company Application October 27, 1953, Serial No. 388,499

Claims priority, application Great Britain October 5, 1951

7 Claims. (Cl. 88—57)

This application is a continuation-in-part of my application Serial No. 313,205, filed October 6, 1952, now abandoned.

The invention relates to variable magnification optical systems and is more particularly concerned with optical systems of the kind (hereinafter referred to as the kind described) for producing an image of continuously variable size of an object at a fixed distance from the system and comprising two normally stationary lenses, having powers of like sign (i. e., both positive or both negative), and two axially movable lenses, having powers of like sign which is opposite to the sign of the powers of the normally stationary lenses, all of which lenses are arranged on a common optical axis with the movable lenses between and spaced from the two normally stationary lenses, and in combination with the lenses magnification varying means for continuously and simultaneously differentially moving the movable lenses in the axial direction of the system according to a law such that the distance from the normally stationary lenses at which the image of an object at a fixed distance from the normally stationary lenses is accurately focussed remains constant, while the size of the said image is continuously varied during the operation of the magnification varying means, in which system the movable lenses and their range of movement are such that, for one final image position of the system, at one position (hereinafter referred to as their mean position) of their movement they have a joint magnification of minus 1.

The movable lenses are movable in one axial direction away from their mean position to a far position, spaced from their mean position, and are preferably also movable in the opposite axial direction from their mean position to another far position, spaced from their mean position. The, or each, far position may advantageously be a limit of the range of movement of the movable lenses.

The two movable lenses are preferably movable between two far positions such that their joint magnification when they are at one of the far positions is equal to the reciprocal of their joint magnification when they are at the other far position, for at least one final image position of the system.

The term "normally stationary lens" is to be understood to mean a lens which remains stationary during the continuous variation of the size of an image of an object at a fixed distance from the system.

Examples of optical systems of the kind described are described and claimed in the specifications of United States Patents Nos. 2,501,219, 2,514,239, 2,537,561 and 2,566,889, and pending application Serial No. 236,482, now Patent No. 2,663,223, dated December 22, 1953.

The invention is more especially but not exclusively, concerned with systems of the kind described in which the normally stationary lenses are positive and the movable lenses are negative (i. e. as described in United States patent specification No. 2,514,239).

In systems of the kind to which the invention relates, one or both of the two normally stationary lenses may be mounted for adjusting movement along the optical axis and focus-adjustment means may be provided and may be operable, independently of the magnification-varying means, to move the or each adjustably mounted stationary lens to effect focussing of the system, as described and claimed in United States patent specification No. 2,566,889 and in British patent specification No. 639,611. It will be appreciated that although the operation of the focus-adjustment means is described in that specification with special relation to initial focussing of the system on to a fixed object before operation of the magnification-varying means, the focus-adjustment means specifically described in that specification may equally well be adjusted during operation of the magnification-varying means without alteration to the structure specifically described in that specification. Thus the magnification of the system described in that specification may also be varied while the focussing of the system is adjusted independently to keep in focus an object which moves during the variation of magnification.

Further, in such system each of the four lenses may be a compound lens comprising two or more component lenses in contact or spaced apart by a fixed distance or fixed distances, one or more of which component lenses may comprise two or more lens elements in contact.

It is an object of the present invention to provide an improved optical system of the kind described, in which the aberrations are reduced or substantially corrected.

The primary aberrations which may occur in systems of the kind described are of seven main types usually denoted by symbols, viz: $S_1$=spherical aberrations, $S_2$=coma, $S_3$=astigmatism, $S_4$=field curvature, $S_5$=distortion, $L$=axial chromatic aberration, and $T$=chromatic variation of magnification.

It is well known that when the chromatic aberrations $L$ and $T$ of a lens system are corrected for one position of the object and stop, they will also be corrected in all positions of the object and stop. Consequently the system may be substantially corrected for chromatic aberrations by employing achromatic lenses throughout the system. It then follows that the system will have substantially no chromatic aberrations no matter how the relative positions of the movable lenses vary during the variation of the image size.

Further it is well known that the field curvature $S_4$ of a lens system is determined by the construction of the individual lenses and is quite independent of the positions of the object and the stop. Consequently the system may be made substantially free of field curvature for all positions of the movable lenses by so arranging the construction of the system that it is free from field curvature for any one position of the movable lenses.

The invention provides in one of its aspects a variable magnification optical system of the kind described, in which the lenses are such that the respective differences between the values of spherical aberration, coma, astigmatism and distortion produced by the movable lenses when they are at their mean position and the corresponding values of those four aberrations produced by the movable lenses when they are in their far position or in one or each of their far positions, are substantially equal and opposite to the respective differences between the values of spherical aberration, coma, astigmatism and distortion produced by the said two normally stationary lenses when the movable lenses are at their mean position and the corresponding values of those four aberrations produced by the said two normally stationary lenses when the movable lenses are at the said far position, whereby each of the said four aberrations has substantially the same magnitude and sign when the movable lenses are in their far position or one or each of their far positions as when they are in their mean position.

The lenses are preferably such that the coma and distortion produced by the movable lenses are zero when the movable lenses are at their mean position and the coma and distortion produced by the said two normally stationary lenses are zero when the movable lenses are in their mean position, whereby the coma and distortion of the system are zero when the movable lenses are in their mean position and also when the movable lenses are at their far position or at either of their far positions.

The movable lenses preferably are compound and optically identical, except, it may be, in respect of their apertures, and are arranged with their refracting surfaces symmetrically positioned about a point on the axis mid-way between the movable lenses.

The said two normally stationary lenses preferably are compound and optically identical, except, it may be, in respect of their apertures, and are arranged with their refracting surfaces symmetrically positioned about a point on the axis mid-way between the said two normally stationary lenses.

For the consideration of the theory of the system it is convenient to assume that the effective stop of the system is positioned between the two movable lenses and is preferably such as the ratio of the incidence height of the principal ray to the incidence height of the paraxial ray is substantially as much negative as one of the movable lenses as it is positive at the other movable lens. Nevertheless, in practice the effective stop may be situated in any one of a number of positions, since if the aberrations of the system are corrected for any one position of the effective stop they are automatically corrected for all other positions of the effective stop, at least so far as primary aberrations are concerned. As a practical example the stop may be in the form of an apertured diaphragm and may be positioned at a fixed axial distance from, and be arranged for movement with, that one of the two movable lenses which is nearer to the final image position of the system, the arrangement being, for example, as described in pending application Serial No. 236,482, now Patent No. 2,663,223.

It can be shown from optical theory that when the hereinbefore mentioned preferred arrangements are employed, the values of the spherical aberration $S_1$, astigmatism $S_3$ and field curvature $S_4$ of the movable lenses at one of their far positions are respectively substantially equal in magnitude and sign to the corresponding values of those three aberrations of the movable lenses when they are at their other far position.

It can also be shown from optical theory that when the hereinbefore mentioned preferred arrangements are employed, the values of the (joint) coma $S_2$, and distortion $S_5$ of the movable lenses at one of their far positions are respectively substantially equal in magnitude and opposite in sign to the corresponding values of those two aberrations of the movable lenses when they are at their other far position.

Further, the respective differences between the values of the spherical aberration $S_1$, coma $S_2$, astigmatism $S_3$, field curvature $S_4$ and distortion $S_5$ of the movable lenses at one of their far positions, and the corresponding values of those five aberrations of the movable lenses when they are at their mean position are functions only of the following, namely the spherical aberration and the central coma of each of the movable lenses when they are at their mean position. The constants that appear in the expressions for those differences involve only the Petzval sum for the movable lenses, the power of each of the movable lenses, and the effective positions of the object, image and stop.

The term "central coma" of a lens is to be understood to mean the coma of the lens if the effective stop is assumed to be placed in contact with the lens. By the Petzval sum for the movable lenses is means the sum of the powers of the separate lens elements divided by the respective refractive indices of the glasses of which they are made.

For convenience the values respectively of the spherical aberration and central coma of that one of the two movable lenses which is nearer to the object, when the movable lenses are in their mean position, will be hereinafter denoted by $(S_1)_2$ and $(S_2)_2$ respectively.

It can also be shown from optical theory that analogous results are obtained for the joint aberrations of the two normally stationary lenses when the movable lenses are in their mean and far positions. Thus, if $(S_1)_1$ and $(S_2)_1$ denote respectively the spherical aberration and central coma of that one of the two normally stationary lenses which is nearer to the object, when the movable lenses are in their mean position, there may be expressed in terms of $(S_1)_1$ and $(S_2)_1$ the respective differences between the values of spherical aberration $S_1$, coma $S_2$, astigmatism $S_3$ and distortion $S_5$ produced jointly by the two normally stationary lenses when the two movable lenses are at either of their far positions, and the corresponding values of those four aberrations when the two movable lenses are at their mean position. The joint field curvature of the normally stationary lenses does not vary as the movable lenses are moved, and further, there is no theoretical need to assume that the normally stationary lenses are thin, as the effective object and image positions for those lenses do not change as the movable lenses are moved.

The value of $(S_1)_1$, $(S_2)_1$, $(S_1)_2$ and $(S_2)_2$ which it is necessary to employ in order to produce a system in accordance with the invention may thus be determined by solving the following four simultaneous equations:

$$d(S_1)m + d(S_1)ns = 0$$
$$d(S_2)m + d(S_2)ns = 0$$
$$d(S_3)m + d(S_3)ns = 0$$
$$d(S_5)m + d(S_5)ns = 0$$

where:

The operator "$d$" denotes the difference between the value of an aberration produced when the movable lenses are at either of their far positions and the corresponding value of that aberration when the movable lenses are at their mean position.

The subscript "$m$" denotes an aberration produced jointly by the movable lenses, and The subscript "$ns$" denotes an aberration produced jointly by the two normally stationary lenses.

It can also be shown that when those four equations are satisfied the variations in the aberrations of the system during the movement of the movable lenses between their far positions and their mean positions are either zero or very small. Further, since the coma and distortion of the system are both zero when the movable lenses are in their mean position, the coma and distortion of the system are also substantially zero when the movable lenses are at either of their far positions. Spherical aberration, astigmatism and field curvature will be small but, in general, not zero.

Any compound lens consisting of two or more lenses in contact, in any of the above described symmetrical arrangements, may be replaced by another compound lens consisting of two or more lenses in contact and destroying the symmetry, providing that the power, the spherical aberration, central coma and Petzval sum of the replacing and replaced compound lenses are substantially the same at any one position in the range of movement of the movable lenses. This follows from the fact, which may be proved theoretically, that the spherical aberration, central coma and Petzval sum of a system of thin lenses in contact determine uniquely all the aberrations of that system of thin lenses, irrespective of the position of the effective positions of the object and stop for that system. Thus considerations of symmetry simplify the theory of the systems according to the invention, but in practice departures from symmetry may be advantageous and such departures are within the scope of the invention. For example, it is sometimes possible to replace a lens in which at some surface the angles of incidence of one or more rays are large by a lens in which these angles are less, with a consequent reduction in higher order aberration. Symmetrical arrangements however employ identical lenses in different positions in the system and consequently are preferred on economic grounds.

One or more additional normally stationary lens may be added, e. g. between the rear one of the said two normally stationary lenses and the image receiving position, to cancel out all or some of the remaining aberrations of the system when the movable lenses are at their mean position. The additional normally stationary lens or lenses will then also substantially cancel out the remaining aberrations of the system when the movable lenses are at either of their far positions and also to a very large extent when the movable lenses are at any other position in their range of movement, provided that the aberrations of the additional normally stationary lens are small enough for displacement of the effective stop position for that lens to produce only negligible changes in those aberrations. The additional normally stationary lens or lenses may conveniently convert the system from an afocal one to one of finite focal length.

Each movable lens may comprise two doublet component lenses spaced apart by a fixed axial distance. The spherical aberration and central coma of one doublet in each movable lens, when the movable lenses are at their mean position, may be chosen independently of the corresponding constants of the other doublet in each movable lens. Consequently two additional independent design variables are available and may be chosen so as to satisfy the following two additional conditions, namely that the joint spherical aberration of the four lenses (two movable and two normally stationary) shall be zero and that the joint astigmatism of the four lenses shall have a desired value. For example the value of that astigmatism may be chosen in relation to the total field curvature of the four lenses so that the tangential image surface lies in the paraxial focal plane. The system is in that case substantially completely corrected for primary aberrations.

The foregoing theoretical considerations apply to a four lens system which is afocal or which is such that the object and image are symmetrically positioned with respect to the system.

In a modification of the hereinbefore mentioned aspect of the invention the lenses may be such that $$(S_1)_1 + (S_1)_2 = 0$$

instead of fulfilling the condition that the difference between the value of distortion produced by the movable lenses when they are at their mean position and the value of the distortion produced by the movable lenses when they are at their far position, or one of their far positions, is substantially equal and opposite to the difference between the value of distortion produced by the two normally stationary lenses when the movable lenses are at their mean position and the value of the distortion produced by the two normally stationary lenses when the movable lenses are at the said far position.

Such a modified system has zero spherical aberration, zero coma and substantially constant astigmatism over the range of movement of the movable lenses. This system may be employed with an additional normally stationary aplanatic lens having a value of astigmatism which cancels out that of the system. Such cancellation is preferably arranged to be exact for both far positions and the mean position of the movable lenses. In that arrangement the cancellation is very nearly exact for all other positions of the movable lenses, as only the effective stop position for the additional normally stationary lens changes on movement of the movable lenses and, since the additional stationary lens is aplanatic, the astigmatism of that lens will remain constant and of a value which is equal and opposite to that of the rest of the system, during the movement of the movable lenses. Distortion remains, but in many applications quite large distortion can be tolerated.

Figure 5:
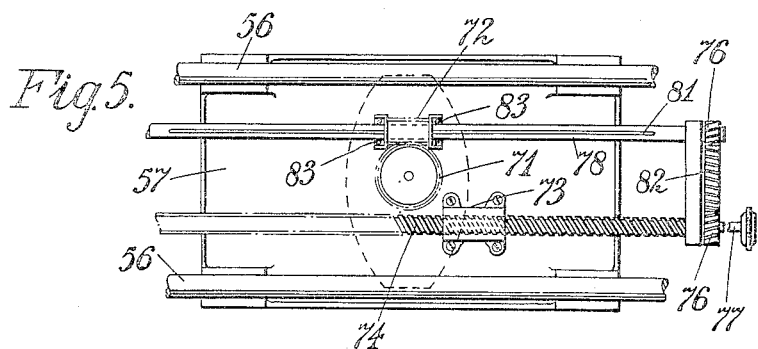
Figure 6:
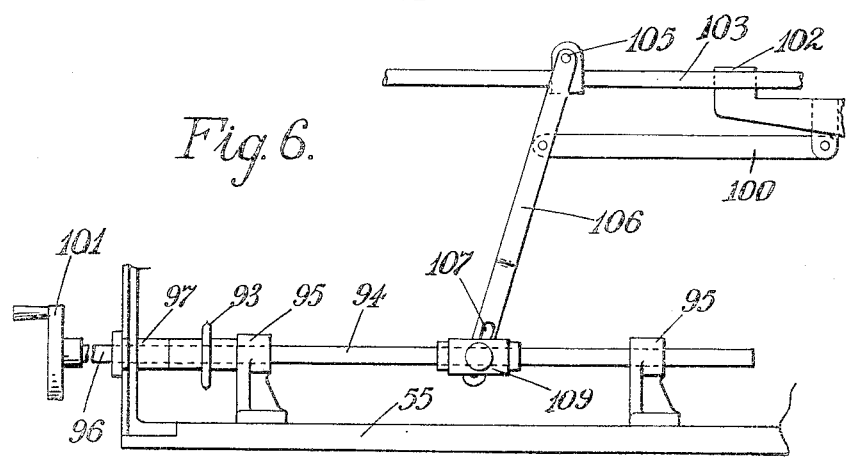

A specific construction of an optical system according to the invention will now be described by way of example and with reference to the accompanying drawings, in which:

Figure 1 is a diagrammatic longitudinal section through the system showing the arrangement of the lenses, Figure 2 is a side view of the system with part of the cover removed and with part of the focussing control system omitted for the sake of clarity, Figure 3 is a plan view of the system with part of the cover removed, Figure 4 is a front view of the system, Figure 5 is a detail view showing the underside of the carrier, and Figure 6 is a detail view showing the focussing control arrangement.

The system, in this example, comprises two normally stationary positive compound achromatic lenses 21, 24 and two movable negative compound achromatic lenses 22, 23. The lens 21 comprises three component lenses 11, 12, 13 having optical surfaces $r_1$, $r_2$, $r_3$, $r_4$, $r_5$. The components 12, 13 are in contact. The components 11, 12 are spaced apart by a fixed distance. The lens 24 comprises three component lenses 18, 19, 20 having optical surfaces $r_{12}$, $r_{13}$, $r_{14}$, $r_{15}$, $r_{16}$. The components 18, 19 are in contact. The components 19, 20 are spaced apart by a fixed distance.

The lens 22 comprises two component lenses 14, 15 in contact and having optical surfaces $r_6$, $r_7$, $r_8$. The lens 23 comprises two component lenses 16, 17 in contact and having optical surfaces $r_9$, $r_{10}$, $r_{11}$.

The various component lenses are made of glasses having the following properties, and the component lenses or elements have the following axial thicknesses (in inches):

| Element | Axial Thickness | $N_d$ | V |
| --- | --- | --- | --- |
| 11 | $t_1 = 0.40$ | 1.5722 | 57.7 |
| 12 | $t_2 = 0.40$ | 1.62576 | 35.7 |
| 13 | $t_3 = 0.80$ | 1.5722 | 57.7 |
| 14 | $t_4 = 0.2449$ | 1.56938 | 55.8 |
| 15 | $t_5 = 0.5943$ | 1.62576 | 35.7 |
| 16 | $t_6 = 0.5948$ | 1.62576 | 35.7 |
| 17 | $t_7 = 0.2449$ | 1.56938 | 55.8 |
| 18 | $t_8 = 0.80$ | 1.5722 | 57.7 |
| 19 | $t_9 = 0.40$ | 1.62576 | 35.7 |
| 20 | $t_{10} = 0.40$ | 1.5722 | 57.7 |

$N_d$ is the refractive index for the $d$-line.
V is the reciprocal of the dispersive power.

The air spaces between the elements 11 and 12, and 19 and 20, respectively are (in inches):

$$S_1' = 0.0994$$
$$S_2' = 0.0994$$

The optical surfaces have the following radii (in inches):

$r_1 = 9.9504$
$r_2 = 127.916$
$r_3 = 20.995$
$r_4 = 4.1606$
$r_5 = \text{infinity}$
$r_6 = -8.2034$
$r_7 = 2.1286$
$r_8 = 7.7990$
$r_9 = -7.7990$
$r_{10} = -2.1286$
$r_{11} = 8.2034$
$r_{12} = \text{infinity}$
$r_{13} = -4.1606$
$r_{14} = -20.995$
$r_{15} = -127.916$
$r_{16} = -9.9504$ The radii are expressed as minus quantities in the case of surfaces which are concave towards light entering the system through the lens 21, which in normal use is the front lens.

The lenses have the following diameter (in inches):

| Lens: | Diameter |
|---|---|
| 21 | 4.6 |
| 22 | 2.8 |
| 23 | 2.3 |
| 24 | 4.6 |

It will be appreciated that the lenses 22 and 23 are identical with one another with respect to the radii of their optical surfaces, their glasses and the thickness of their components and are symmetrically positioned about a point on the axis midway between the lenses 22 and 23.

The axial separations (in inches) between the lenses 21, 22, 23 and 24 are indicated at $S_1''$, $S_2''$, and $S_3''$ and the necessary law of movement gives values of those separations as follows for an object at infinity with respect to the system:

| $S_1''$ | $S_2''$ | $S_3''$ | Magnification |
|---|---|---|---|
| 0.74361 | 2.62303 | 6.77110 | $-1/2.24$ Far position. |
| 1.44569 | 2.04875 | 6.64330 | $-1/2$ |
| 3.36855 | 0.76792 | 6.00127 | $-1/\sqrt{2}$ |
| 4.91076 | 0.31622 | 4.91076 | $-1$ Mean position. |
| 6.00127 | 0.76792 | 3.36855 | $-\sqrt{2}$ |
| 6.64330 | 2.04875 | 1.44569 | $-2$ |
| 6.77110 | 2.62303 | 0.74361 | $-2.24$ Far position. |

An aperture stop 25 is positioned between the lenses 23 and 24 at an axial distance of 2.5 from the axial midpoint between the lenses 22 and 23. The maximum diameter of the light beam transmitted along the axis of the system is 3.2 at surface $r_{16}$.

The two lenses 21 and 24 are carried in cells 51, 52 mounted in end plates 53, 54 at the ends of the top face of a rectangular base plate 55 which extends horizontally forward from the front of the camera. Two straight rods or tubes 56 extend along the top face of the base plate 55 along the length thereof from one end plate to the other, parallel to the sides of the base plate. A carrier 57, comprising a smaller rectangular plate 59, has longitudinal grooves 58 in one of its faces and those grooves 58 rest over the rods 56 so that the carrier 57 is slidable along them. The carrier 57 has above and spaced from its upper face two rods or tubes 61 extending longitudinally from one end of the carrier 57 to the other near and parallel to the sides of the carrier, the rods 61 being secured to brackets 62 on the carrier. The lenses 22 and 23 are mounted in cells 63, 64 attached to sleeves 65 which slide along the rods 61. The two sleeves 65 are connected in pairs by members 66 which each carry a small roller 67 rotatable about a vertical axis. The two rollers 67 contact diametrically opposite parts of the periphery of a cam 68 which is carried on a short vertical shaft extending through the carrier plate 59 and carrying, at the lower face of the carrier plate, a gear wheel 71 which is in engagement with a worm 72.

The lower face of the carrier has securely attached to it a nut 73 in engagement with a lead screw 74 which is journalled in brackets 75 secured to the base plate 55 and may be rotated so as to move the carrier 57 along the base-plate 55. The lead-screw 74 is connected through an extension shaft 77, gears 76 and an idler gear 82 to a shaft 78 running parallel to the lead-screw and also journalled in the brackets 75. The worm 72 is slidable along the shaft 78 and has a key engaged with a keyway 81 in the shaft 78 for rotation with that shaft. The worm 72 lies between two brackets 83 extending downward from the carrier so that the worm is constrained to move with the carrier and thereby to remain in engagement with the gear 71 on the cam shaft. Consequently on rotation of the lead-screw 74 the cam 68 rotates while the carrier is moved. The two sleeves on each of the tubes on the carrier are spring-urged towards one another, e. g. by compression springs 84, so that the rollers 67 on the two sleeve-connecting members 66 are maintained in engagement with the cam 68. The cam 68 is of symmetrical elongated shape and is arranged so that, in accordance with the optical requirements, the lenses 22, 23 approach one another to a minimum separation and then move apart again to a maximum separation while they are both moved along the base-plate from one extreme position to the other. Back-lash in the gearing is reduced to a minimum by accurate machining and if desired the idler wheel 82 may be urged into even closer engagement with the gears 76 by means of a strong spring.

The lead-screw shaft 77 carries a chain wheel 91 connected by a driving chain 92 to a chain wheel 93 on a shaft 94 which is journalled in brackets 95 on the base plate 55. The shaft 94 is movable axially in the brackets 95 and has a key-way 96 into which the chain wheel 93 is keyed, e. g. by grub-screws 98, for rotation with the shaft 94, being held against axial movement by the adjacent bracket 95 and a sleeve 97. The shaft 94 is provided with a control handle 101 by means of which it may be rotated or moved axially.

The cell 51 carrying the lens 21 is attached to a slide member 102 which is slidable along rods or tubes 103, extending between the end plates 53, 54, to move the lens 21 axially for focussing the system on to any particular object at a distance from infinity to about 13 feet 9 inches away from the system. The range of movement of the cell 51 is from the position shown in full lines to that shown in chain lines in Figure 2. The slide member 102 is connected by a pivoted link 100 to an arm 104 rigidly attached to one end of a shaft 105 journalled in blocks 110 rigidly mounted on the rods 103. The other end of the shaft 105 (see Figures 3 and 6) is rigidly secured to an arm 106 having a slot 107 sliding on a headed stud 108 provided on a sleeve 109 rigidly secured to the shaft 94. Axial movement of the shaft 94 as aforesaid, consequently produces corresponding axial focussing movement of the lens cell 51.

An iris diaphragm 111, constituting the aperture stop 25, is mounted on the carrier 57 so that when the lenses 22, 23 are in their extreme positions the diaphragm is very close to the optical surface $r_{11}$ of the lens 23. The diaphragm housing 112 is rigidly mounted on the carrier 57 by members 113 so that when the lens 23 is moved by the cam 68 the lens 23 moves away from the diaphragm 111 through a short distance. The radially extending operating lever 114 of the diaphragm is connected by a short telescopic extension to a ball 115 which is trapped between opposed grooves formed in the side walls of a longitudinally extending straight slot 116 in an arm 117. The arm 117 is pivoted at 118 about a horizontal axis to a bracket 119 at the front end of the base-plate 55 and extends upwardly and rearwardly from the pivot 118, along the side of the lens system, and its upper end is provided with a guide channel 121 which embraces, and slides along, a quadrant guide plate 122 secured to the end plate 54. As the carrier moves along the base-plate the operating lever 114 of the iris diaphragm is moved by the cam action of the slot 116 in the arm on the ball 115 which cooperates with it. The iris diaphragm is thereby adjusted to maintain the optical system at a substantially constant relative aperture while the lenses 22 and 23 are moved. The arm 117 has a second slot 123 which receives a pin 124 on an arm 125 rigidly mounted on a shaft 126 pivoted in brackets 127, 128. The shaft 126 is provided with a central knob 131 whereby it may be rotated to cause the pin 124 to rotate arm 117 about its pivot 118, thereby to change the inclination of the arm 117 relative to the optical axis and consequently to change the value at which the relative aperture of the system is maintained substantially constant while the lenses 22 and 23 are moved to vary the magnification. The knob is provided with a spring ball detent 132 engaging with any one of a series of depressions in a plate 133, which depressions are marked with the values of relative aperture corresponding to engagement with the respective depressions.

In this example the spherical aberration is substantially zero over the complete range of magnification, and coma and chromatic aberration are similarly corrected. The astigmatism and field curvature are both very small and remain constant over the complete range of magnification together they amount to only approximately —14 wavelengths at the above-mentioned full aperture and for an angle of field of 6° in the image space (the negative sign indicating a hollow field).

In this example the system is an afocal telescopic system for producing an image effectively at infinity. For use with effectively non-infinite image distances one or more auxiliary lenses may be employed in conjunction with it. When an auxiliary objective lens of focal length 9.7 inches is placed after the system of this example the resultant combination has the same focal length aperture and range of magnification as the system described specifically in pending application Serial No. 236,482, now Patent No. 2,663,223.

The invention is not restricted to the details of the foregoing example. For instance, the mechanical details and the general arrangements of the system may be substantially as described in one or more of the other specifications mentioned herein, subject to modifications to meet the optical conditions set out herein. The system is not necessarily an afocal system, it may be designed, for example, as a complete camera objective lens.

I claim:

1. A variable magnification optical system, for producing an image of continuously variable size of an object at a fixed distance from the system, comprising two normally stationary lenses, having powers of like sign, and two axially movable lenses, having powers of like sign which is opposite to the sign of the powers of the normally stationary lenses, all of which lenses are arranged on a common optical axis with the movable lenses between and spaced from the two normally stationary lenses, and in combination with the lens magnification varying means for continuously and simultaneously differentially moving the movable lenses in the axial direction of the system according to a law such that the distance from the normally stationary lenses at which the image of an object at a fixed distance from the normally stationary lenses is accurately focussed remains constant, while the size of the said image is continuously varied during the operation of the magnification varying means, in which system the movable lenses and their range of movement are such that, for one final image position of the system, at a mean position of their movement they have a joint magnification of minus one, the movable lenses being movable as aforesaid from their mean position to at least one far position, and in which system the lenses are such that the respective differences between the values of spherical aberration, coma, astigmatism and distortion produced by the movable lenses when they are at their mean position and the corresponding values of those four aberrations produced by the movable lenses when they are in their said far position, are substantially equal and opposite to the respective differences between the values of spherical aberration, coma, astigmatism and distortion produced by the said two normally stationary lenses when the movable lenses are at their mean position and the corresponding values of those four aberrations produced by the said two normally stationary lenses when the movable lenses are at the said far position, whereby each of the said four aberrations has substantially the same magnitude and sign when the movable lenses are in their said far position as when they are in their mean position.

2. A variable magnification optical system according to claim 1, wherein the lenses are such that the coma and distortion produced by the movable lenses are zero when the movable lenses are at their mean position and the coma and distortion produced by the said two normally stationary lenses are zero when the movable lenses are in their mean position, whereby the coma and distortion of the system are zero when the movable lenses are in their mean position and also when the movable lenses are at their said far position.

3. A variable magnification optical system for producing an image of continuously variable size of an object at a fixed distance from the system, comprising two normally stationary lenses, having powers of like sign, and two axially movable lenses, having powers of like sign which is opposite to the sign of the powers of the normally stationary lenses, all of which lenses are arranged on a common optical axis with the movable lenses between and spaced from the two normally stationary lenses, and in combination with the lens magnification varying means for continuously and simultaneously differentially moving the movable lenses in the axial direction of the system according to a law such that the distance from the normally stationary lenses at which the image of an object at a fixed distance from the normally stationary lenses is accurately focussed remains constant, while the size of the said image is continuously varied during the operation of the magnification varying means, in which system the movable lenses and their range of movement are such that, for one final image position of the system, at a mean position of their movement they have a joint magnification of minus one, the movable lenses being movable as aforesaid from their mean position to at least one far position and in which system the said lenses are such that their joint spherical aberration is zero, and the lenses are such that the respective differences between the values of spherical aberration, coma and astigmatism produced by the movable lenses when they are at their mean position and the corresponding values of those three aberrations produced by the movable lenses when they are at their said far position are substantially equal and opposite to the respective differences between the values of spherical aberration coma and astigmatism produced by the said two normally stationary lenses when the movable lenses are at their mean position and the corresponding values of those three aberrations produced by the said two normally stationary lenses when the movable lenses are at the said far position.

4. A variable magnification optical system according to claim 3 wherein the lenses are such that the system has zero spherical aberration and zero coma over the range of movement of the movable lenses between their mean position and their said far position, whereby the astigmatism of the system is constant for movement of the movable lenses between their mean position and their said far position.

5. A variable magnification optical system, for producing an image of continuously variable size of an object at a fixed distance from the system, comprising two normally stationary lenses, having powers of like sign, and two axially movable lenses, having powers of like sign which is opposite to the sign of the powers of the normally stationary lenses, all of which lenses are arranged on a common optical axis with the movable lenses between and spaced from the normally stationary lenses, and in combination with the lens magnification varying means for continuously and simultaneously differentially moving the movable lenses in the axial direction of the system according to a law such that the distance from the normally stationary lenses at which the image of an object at a fixed distance from the normally stationary lenses is accurately focussed remains constant, while the size of the said image is continuously varied during the operation of the magnification varying means, in which system the movable lenses and their range of movement are such that, for one final image position of the system, at a mean position of their movement they have a joint magnification of minus one, the movable lenses being movable aforesaid from their mean position to at least one far position, the said lenses satisfying the equations:

$$d(S_1)m + d(S_1)ns = 0$$
$$d(S_2)m + d(S_2)ns = 0$$
$$d(S_3)m + d(S_3)ns = 0, \text{ and}$$
$$d(S_5)m + d(S_5)ns = 0$$

in which equations the operator "$d$" denotes the difference between the value of an aberration produced when the said movable lenses are at the said far position and the corresponding value of that aberration when the said movable lenses are at their mean position, the subscript $m$ denotes an aberration produced jointly by the said movable lenses, the subscript $ns$ denotes an aberration produced jointly by the said two normally stationary lenses, $S_1$ denote spherical aberration, $S_2$ denotes coma, $S_3$ denotes astigmatism and $S_5$ denotes distortion.

6. A variable magnification optical system, for producing an image of continuously variable size of an object at a fixed distance from the system, comprising two normally stationary lenses, having powers of like sign, and two axially movable lenses, having powers of like sign which is opposite to the sign of the powers of the normally stationary lenses, all of which lenses are arranged on a common optical axis with the movable lenses between and spaced from the two normally stationary lenses, and in combination with the lens magnification varying means for continuously and simultaneously differentially moving the movable lenses in the axial direction of the system according to a law such that the distance from the normally stationary lenses at which the image of an object at a fixed distance from the normally stationary lenses is accurately focussed remains constant, while the size of the said image is continuously varied during the operation of the magnification varying means, in which system the movable lenses and their range of movement are such that, for one final image position of the system, at a mean position of their movement they have a joint magnification of minus one, the movable lenses being movable as aforesaid from their mean position to at least one far position, the spherical aberration produced jointly by the said lenses being zero, and the said lenses satisfying the equations:

$$d(S_1)m + d(S_1)ns = 0$$
$$d(S_2)m + d(S_2)ns = 0, \text{ and}$$
$$d(S_3)m + d(S_3)ns = 0$$

in which equations the operator $d$ denotes the difference between the value of an aberration produced when the said movable lenses are at the said far position and the corresponding value of that aberration when the said movable lenses are at their mean position, the subscript $m$ denotes an aberration produced jointly by the said movable lenses, the subscript $ns$ denotes an aberration produced jointly by the said two normally stationary lenses, $S_1$ denotes spherical aberration, $S_2$ denotes coma, and $S_3$ denotes astigmatism.

7. A variable magnification optical system according to claim 1, wherein the movable lenses are compound and optically identical at least in respect of the radii of their optical surfaces, their glasses and the thickness of their components, and are arranged with their refracting surfaces symmetrically positioned about a point on the axis mid-way between the said two movable lenses, and wherein the said four lenses are such that their joint spherical aberration is zero and that their joint astigmatism is such, in relation to their total field curvature, that the tangential image surface lies in the paraxial focal plane, whereby the system is completely corrected for primary aberrations in respect of object and image positions effectively symmetrically positioned with respect to the system.

References Cited in the file of this patent
UNITED STATES PATENTS

| Number | Name | Date |
|---|---|---|
| 2,165,341 | Capstaff et al. | July 11, 1939 |
| 2,235,364 | Gramatzki | Mar. 18, 1941 |
| 2,353,565 | Kaprelian | July 11, 1944 |
| 2,514,239 | Hopkins | July 4, 1950 |
| 2,566,485 | Cuvillier | Sept. 4, 1951 |
| 2,578,574 | Miles | Dec. 11, 1951 |
| 2,649,025 | Cook | Aug. 18, 1953 |
| 2,663,223 | Hopkins | Dec. 22, 1953 |